United States Patent
Roulland et al.

(10) Patent No.: US 9,532,165 B2
(45) Date of Patent: Dec. 27, 2016

(54) METHOD AND APPARATUS FOR LOCATION PREDICTION USING SHORT TEXT

(71) Applicant: Xerox Corporation, Norwalk, CT (US)

(72) Inventors: Frédéric Roulland, Le Versoud (FR); Nidhi Singh, Meylan (FR)

(73) Assignee: Xerox Corporation, Norwalk, CT (US)

( * ) Notice: Subject to any disclaimer, the term of this patent is extended or adjusted under 35 U.S.C. 154(b) by 281 days.

(21) Appl. No.: 14/278,511

(22) Filed: May 15, 2014

(65) Prior Publication Data

US 2015/0334522 A1 Nov. 19, 2015

(51) Int. Cl.
*H04W 4/02* (2009.01)
*H04L 29/08* (2006.01)
*H04W 4/12* (2009.01)
*H04W 4/14* (2009.01)

(52) U.S. Cl.
CPC ............... *H04W 4/02* (2013.01); *H04W 4/12* (2013.01); *H04W 4/14* (2013.01); *H04W 4/028* (2013.01)

(58) Field of Classification Search
CPC ....................................... H04W 4/02
See application file for complete search history.

(56) References Cited

U.S. PATENT DOCUMENTS

| | | | | |
|---|---|---|---|---|
| 2012/0166367 A1* | 6/2012 | Murdock | ............... | G06Q 30/02 706/12 |
| 2012/0291110 A1* | 11/2012 | Park | ..................... | H04W 4/023 726/7 |
| 2013/0325977 A1* | 12/2013 | Drews | ..................... | G06F 17/30 709/206 |
| 2014/0040371 A1* | 2/2014 | Gurevich | .............. | H04L 61/609 709/204 |
| 2015/0046452 A1* | 2/2015 | Agrawal | ........... | G06F 17/30241 707/737 |
| 2015/0113018 A1* | 4/2015 | Steed | ................ | G06F 17/30539 707/776 |

* cited by examiner

*Primary Examiner* — Nicholas Taylor
*Assistant Examiner* — Sanjoy Roy

(57) ABSTRACT

A method, non-transitory computer readable medium, and apparatus for predicting a location of a short text are disclosed. For example, the method trains a model for each parent node of a grid of a plurality of parent nodes of a geographical area using a plurality of previously received short texts having a known location, receives the short text, applies a hierarchical modeling algorithm to the short text to calculate a weighted probability for one or more child nodes of one or more of the plurality of parent nodes and predicts the location of the short text within the grid of the geographical area based upon a child node of the one or more child nodes having a highest weighted probability.

16 Claims, 5 Drawing Sheets

METHOD AND APPARATUS FOR LOCATION PREDICTION USING SHORT TEXT

The present disclosure relates generally to data mining and analysis of short text messages and, more particularly, to a method and apparatus for location prediction using short text.

BACKGROUND

Social media is providing more and more relevant information about individual users and their habits. As a result, more money and time is being invested in data mining the vast amount of data on social media websites. One type of social media is the use of short texts in the form of a microblog also known as a "tweet" from Twitter®. Identifying a location associated with "tweets" can provide valuable information regarding which topics of conversation are occurring in which geographic regions.

Currently, most location prediction methods provide location information of tweets relative to a known landmark or some other geographical asset. However, many times users may be in a location that has no famous landmark or geographical asset. In such a scenario, some user interfaces for mobile devices may ask for the recording of global positioning system (GPS) coordinates of the user. However, these coordinates are collected only for a small subset of the tweets and previous location prediction methods would not be sufficient.

SUMMARY

According to aspects illustrated herein, there are provided a method, a non-transitory computer readable medium, and an apparatus for predicting a location of a short text. One disclosed feature of the embodiments is a method that trains a model for each parent node of a grid of a plurality of parent nodes of a geographical area using a plurality of previously received short texts having a known location, receives the short text, applies a hierarchical modeling algorithm to the short text to calculate a weighted probability for one or more child nodes of one or more of the plurality of parent nodes and predicts the location of the short text within the grid of the geographical area based upon a child node of the one or more child nodes having a highest weighted probability.

Another disclosed feature of the embodiments is a non-transitory computer-readable medium having stored thereon a plurality of instructions, the plurality of instructions including instructions which, when executed by a processor, cause the processor to perform an operation that trains a model for each parent node of a grid of a plurality of parent nodes of a geographical area using a plurality of previously received short texts having a known location, receives the short text, applies a hierarchical modeling algorithm to the short text to calculate a weighted probability for one or more child nodes of one or more of the plurality of parent nodes and predicts the location of the short text within the grid of the geographical area based upon a child node of the one or more child nodes having a highest weighted probability.

Another disclosed feature of the embodiments is an apparatus comprising a processor and a computer readable medium storing a plurality of instructions which, when executed by the processor, cause the processor to perform an operation that trains a model for each parent node of a grid of a plurality of parent nodes of a geographical area using a plurality of previously received short texts having a known location, receives the short text, applies a hierarchical modeling algorithm to the short text to calculate a weighted probability for one or more child nodes of one or more of the plurality of parent nodes and predicts the location of the short text within the grid of the geographical area based upon a child node of the one or more child nodes having a highest weighted probability.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for predicting a location of a short text. As discussed above, identifying a location associated with "tweets" can provide valuable information regarding which topics of conversation are occurring in which geographic regions. However, current location prediction methods provide location information of tweets relative to a known landmark or some other geographical asset. However, many times users may be in a location that has no famous landmark or geographical asset. In such a scenario, previous location prediction methods would not be sufficient.

One embodiment of the present disclosure resolves the problems described above by providing a location of the short text without the need for known landmarks or geographical assets. For example, location may be provided using coordinate information, such as for example, longitude and latitude coordinates. The locations may then be used for data mining of the short texts, such as Tweets® for example, to help analyze and identify trends within the predicted location of the short texts.

Figure 1:
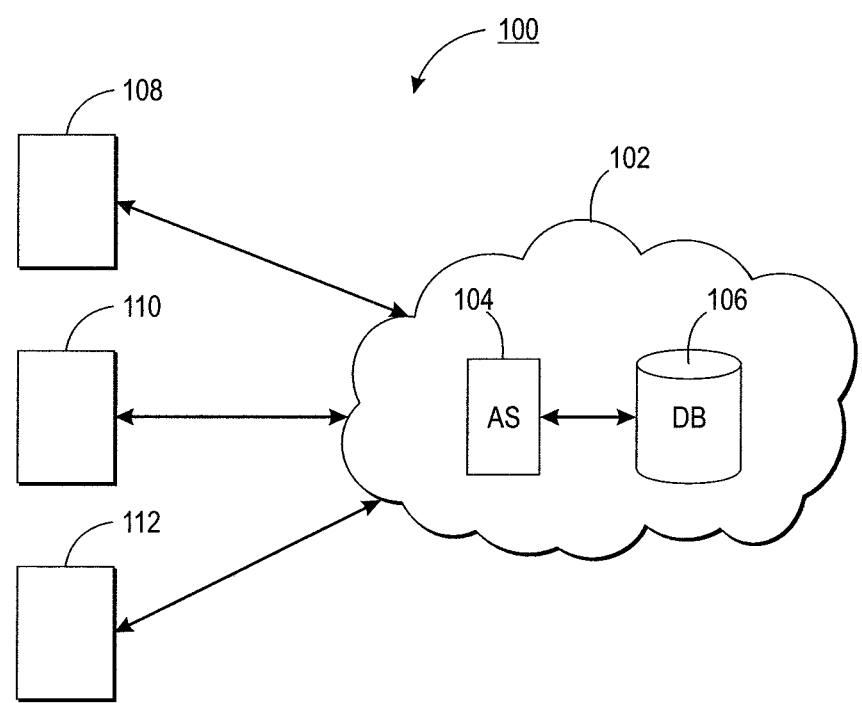
FIG. 1 illustrates an example communication network of the present disclosure.

FIG. 1 illustrates an example communications network 100 of the present disclosure. The communications network 100 may include an Internet Protocol (IP) network 102. The IP network 102 may be any type of IP network capable of transmitting and receiving packets of data such, as for example, a cellular network, a hybrid fiber coax (HFC) network, a cable headend, and the like.

In one embodiment, the IP Network 102 may include an application server (AS) 104 and a database (DB) 106. The AS 104 may be deployed as a general purpose computer (e.g., a general purpose computer illustrated in FIG. 4 and discussed below). The AS 104 may perform the functions and analysis of the short texts disclosed herein. In one embodiment, the DB 106 may be used to store information of users, location information, training models, algorithms used for analysis discussed herein, short texts that are transmitted, and the like.

In one embodiment, the AS 104 and the DB 106 may be operated and maintained by a service provider. For example, the service provider may be a service provider of the IP network 102. In another embodiment, the AS 104 and the DB 106 may be operated and maintained by a third party enterprise that provides a service for providing location prediction of short texts.

It should be noted that the communications network 100 has been simplified for ease of explanation. The communications network 100 may include other access networks not shown. The communications network 100 may include other network elements that are not shown, such as for example, border elements, routers, switches, gateways, firewalls, and the like.

In one embodiment, the communications network 100 may include one or more endpoint devices 108, 110 and 112. Although only three endpoint devices are illustrated in FIG. 1, it should be noted that any number of endpoint devices (e.g., more or less) may be deployed.

The endpoint devices 108, 110 and 112 may be any type of endpoint device capable of generating and transmitting a short text, either via a wired connection or a wireless connection. For example, the endpoint devices 108, 110 and 112 may be a cellular telephone, a smart phone, a tablet computer, a lap top computer, a desktop computer, and the like.

In one embodiment, the endpoint devices 108, 110 and 112 may be located remotely from one another in different geographical locations (e.g., around the world, in a state or in a city). The endpoint devices 108, 110 and 112 may be used to generate and transmit short texts. In one embodiment, the short texts may be associated with a social media platform, such as for example, a "tweet" from Twitter®, a post on Facebook®, and the like.

As discussed above, data mining the short texts that are transmitted by the endpoint devices 108, 110 and 112 may provide valuable information. In one embodiment, data mining short texts to predict locations of the short texts can provide information on where users are gathering, information on what events are trending, and so forth.

Figure 2:
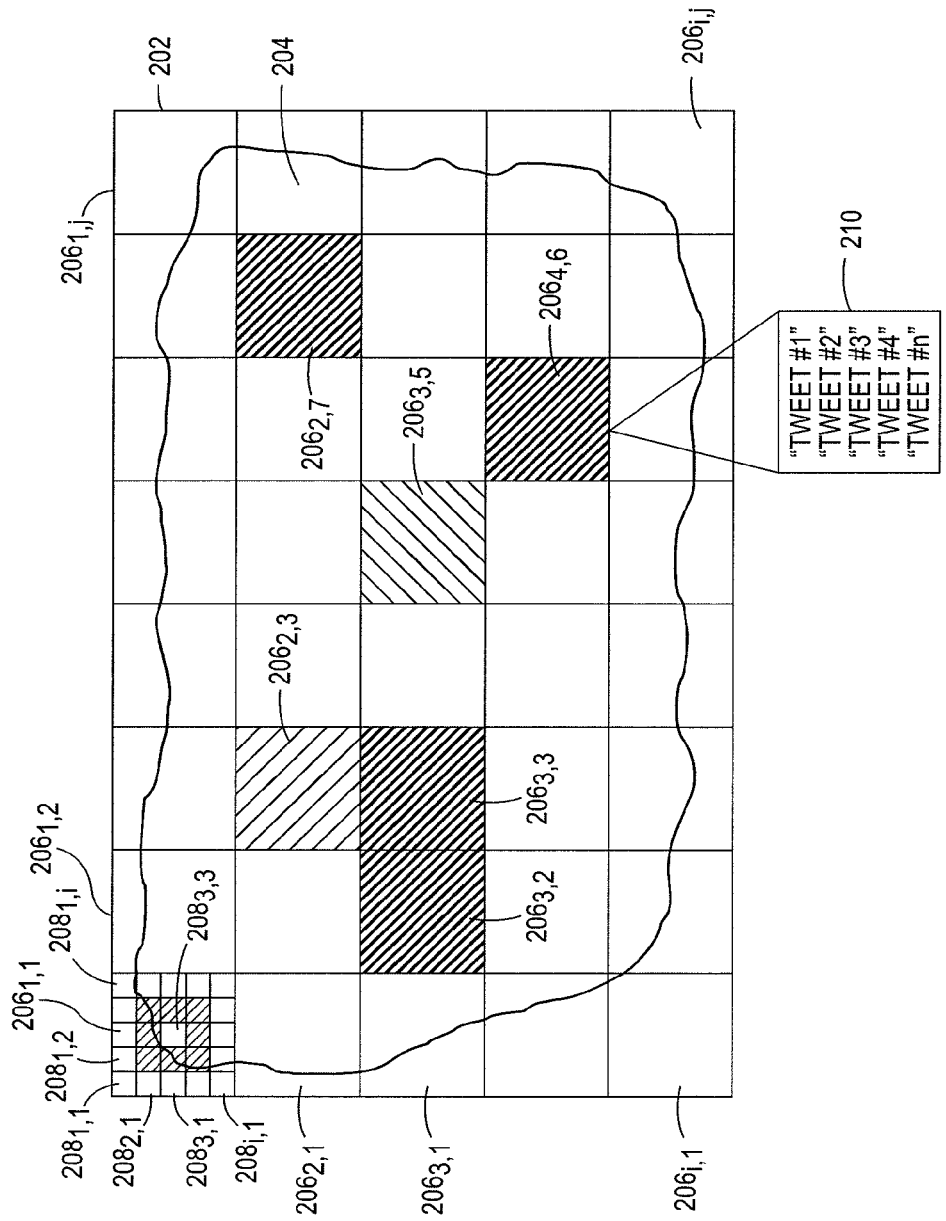
FIG. 2 illustrates an example grid applying a hierarchy of parent nodes and child nodes for a geographical location.

In one embodiment, the predictions of locations of the short texts may be provided to a user in a graphical form that is divided into a grid form. FIG. 2 illustrates an example grid 202 that is applied to a geographical location 204. The geographical location 204 may be a state, a city, a town and the like. In one embodiment, the grid 202 may be divided into a plurality of nodes 206 of i rows and j columns. In one embodiment, the nodes 206 may also be referred to as parent nodes 206, as discussed below when referring to the hierarchical classification algorithm used for location prediction of the short text.

In one embodiment, a color coding scheme or shading scheme may be used to indicate a total number of short texts coming from a particular node 206 that represents an area of the geographical location 204. In one embodiment, the nodes 206 may cover a particular longitude and latitude coordinate or a range of longitude and latitude coordinates.

Using a grid having five rows and eight columns illustrated in FIG. 2 as an example, lightly shaded nodes 206$_{2,3}$ and 206$_{3,5}$ may have a number of short texts that exceed a first level threshold (e.g., 50 to 100 short texts). Darker shaded nodes 206$_{2,7}$, 206$_{3,2}$, 206$_{3,3}$ and 206$_{4,6}$ may have a number of short texts that exceed a second level threshold (e.g., greater than 100 short texts). The parent nodes 206 with no shading may indicate a low number of short texts (e.g., less than 50 short texts). Thus, a user viewing the grid 202 may easily identify where the short texts are coming from and any possible trends in the predicted locations.

In one embodiment, a user may select on a particular node 206 to view all of the short texts that have a predicted location in the selected parent node 206. For example, if the node 206$_{4,6}$ is selected, another window 210 may be displayed that includes all of the short texts that have a predicted location in the node 206$_{4,6}$. In one embodiment, the window 210 may include all of the short texts received over a predefined time period (e.g., over the last 24 hours, over the last hour, over the last week, and the like). In one embodiment, the window 210 may include a scroll bar to scroll the window up and down to view each one of the short texts if all the short texts do not fit in the window 210. In one embodiment, the window 210 may include a filter or a search option to allow a user to filter or to search all of the short texts for a particular topic or key word.

In one embodiment, the method 300 described below may be used to predict a location of each short text. The predicted location of each short text may then be compiled, sorted and organized to generate the grid 202 for the graphical representation of the predicted locations of each one a plurality of short texts.

Figure 3A:
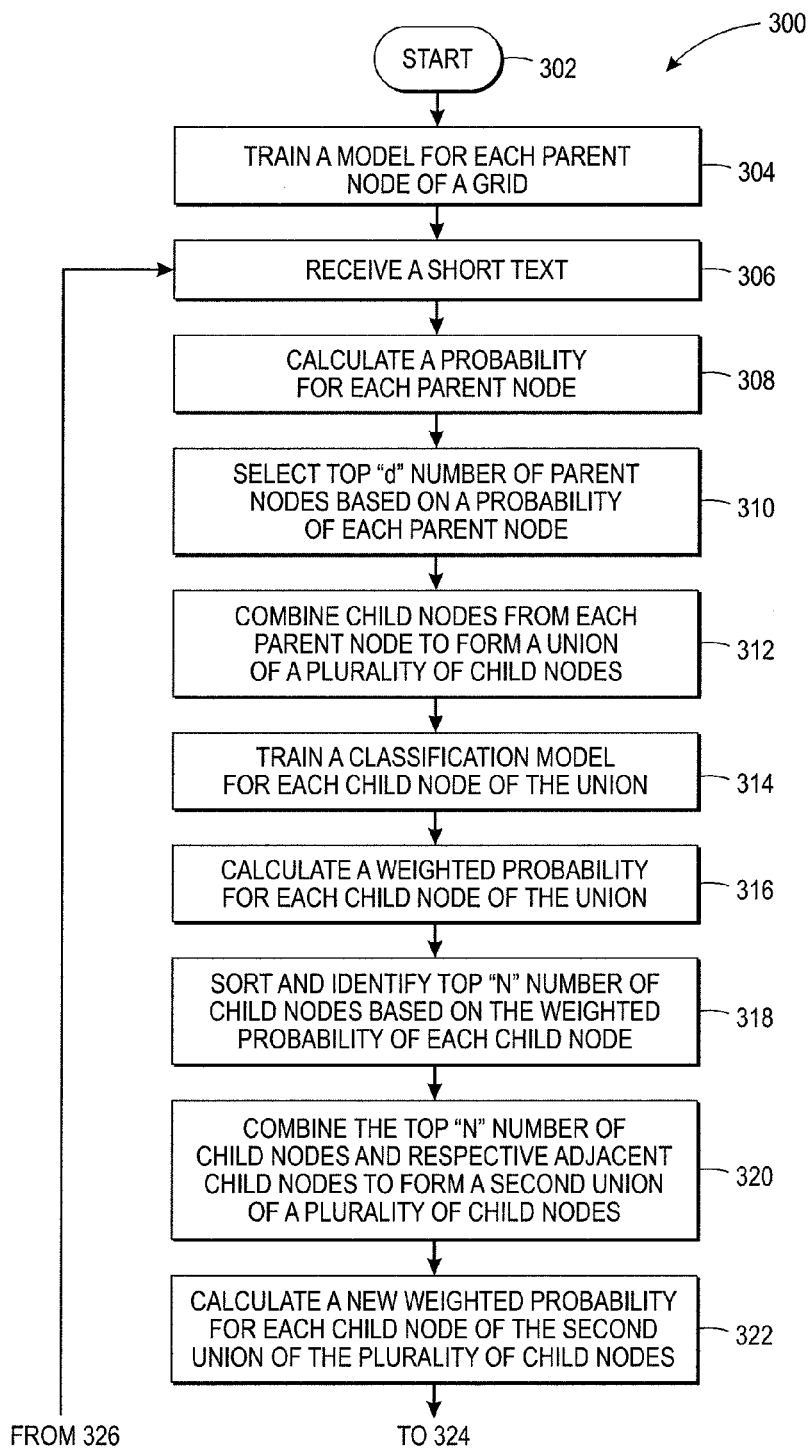
FIGS. 3A and 3B illustrate an example flowchart of one embodiment of a method for predicting a location of a short text.
Figure 3B:
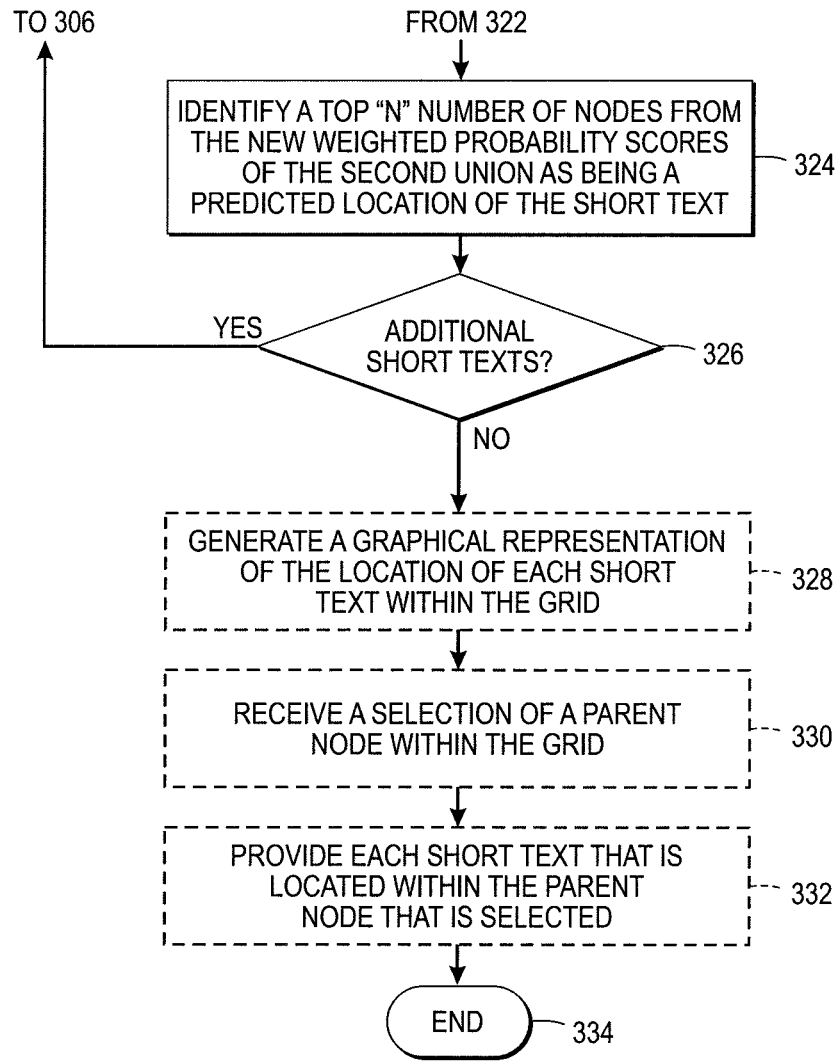
Figure 4:
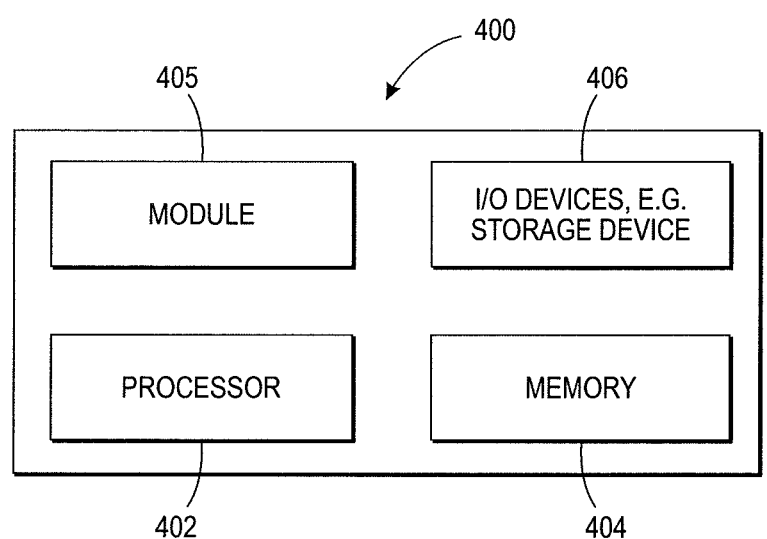
FIG. 4 illustrates a high-level block diagram of a general-purpose computer suitable for use in performing the functions described herein.

FIGS. 3A and 3B illustrate a flowchart of a method 300 for predicting a location of a short text. In one embodiment, one or more steps or operations of the method 300 may be performed by the AS 104 or a general-purpose computer as illustrated in FIG. 4 and discussed below.

At step 302 the method 300 begins. At step 304, the method 300 trains a model for each parent node of a grid. For example, a geographical area may be divided into a plurality of parent nodes (e.g., the parent nodes 206 of the grid 202 illustrated in FIG. 2). A support vector machine (SVM) classifier may be used to train a model using previously received short texts that are geo tagged with known locations for each one of the parent nodes 206 of the grid 202.

For example, a geolocation application may be used on previously received "tweets" to tag each "tweet" with a known location. Then the SVM classifier may be applied to the geo tagged "tweets" to train the model for each one of the plurality of parent nodes 206. The models may then be used to calculate a probability of a short text being located in each parent node 206 that is trained, as discussed below.

At step 306, the method 300 receives a short text. For example, each "tweet" transmitted from a plurality of different mobile endpoint devices may be received and analyzed to predict a location of each one of the "tweets".

At step 308, the method 300 calculates a probability or probability score for each parent node. For example, using the SVM classifier a probability $p(x_{i,j})$ may be calculated for the short text for each parent node $x_{i,j}$ (e.g., the parent nodes 206$_{i,j}$). After the probability is calculated for the short text being located in each parent node $x_{i,j}$, the probabilities are sorted in a descending order.

At step 310, the method 300 selects a top "d" number of parent nodes based on a probability of each parent node. For example, from the descending order of the probabilities of each parent node $x_{i,j}$, a top "d" number of parent nodes may be selected. In one embodiment, "d" may be a dynamic value. The value of "d" may be a function of a desired threshold, $\tau$. The desired threshold may represent a desired probability or accuracy of the prediction. For example, if the desired accuracy is 90%, then the desired threshold, $\tau$, may be set to 0.90, or if the desired accuracy is 85%, then the desired threshold, $\tau$, may be set to 0.85, and so forth.

In one embodiment, the top "d" number of parent nodes, $x_{i,j}$, are selected such that a sum of the respective probabilities are above the desired threshold value. Thus, if τ was set to 0.85 and the descending order of probabilities included 0.42, 0.44, 0.37, 0.35, 0.29, and so forth, "d" would include the first two parent nodes having probabilities of 0.42 and 0.44 (e.g., 0.42+0.44=0.86, which is greater than τ=0.85). Notably, as the values of the probabilities of the parent nodes change, the value of "d" may also vary to require more parent nodes to be selected or less parent nodes to be selected. In other words, "d" may be a dynamic value that is a function of the desired threshold, τ. In one embodiment, the parent nodes selected for the top "d" number of parent nodes may be referred to as nodes $x_{i,j}^1, x_{i,j}^2 \ldots x_{i,j}^d$. In one embodiment, the sum of the top "d" number of parent nodes $x_{i,j}^d$ may be normalized to a value of 1.

At step 312, the method 300 combines child nodes from each parent node to form a union of a plurality of child nodes. For example, each top "d" parent nodes $x_{i,j}^d$ may be further divided into a plurality of child nodes of a second level of the hierarchy nodes. For example, FIG. 2 illustrates the parent node $206_{1,1}$ further divided into child nodes 208 of i rows and j columns. Thus, each child node $C_{i,j}^k$ of each one of the top "d" parent nodes are combined to form a union ∪ of child nodes C according to Equation (1) below:

$$C = \cup_{k=1}^{d} C_{i,j}^k \qquad \text{Eq. (1):}$$

At step 314, the method 300 trains a classification model for each child node of the union. For example, each child node of the union calculated in step 312 may be trained using the SVM classification algorithm, similar to how the models are trained for each parent node in step 304. The previously received short texts that are geo tagged with known locations may also be used to train the models of each child node of the first union.

At step 316, the method 300 calculates a weighted probability for each child node of the union. In one embodiment, the weighted probability of the received short text or "tweet" being located at each one of the child nodes is calculated according to Equation (2) below:

$$w(c_{i,j}) = p(c_{i,j}) + \frac{p(x_{i,j})}{\alpha}, \qquad \text{Eq. (2)}$$

wherein $w(c_{i,j})$ represents the weighted probability of the short text being located at a child node $c_{i,j}$, $p(c_{i,j})$ is a probability of the short text being located at the child node $c_{i,j}$, $p(x_{i,j})$ is a probability of a parent node $x_{i,j}$ and α is a constant denoting a level in a hierarchy of the plurality of parent nodes and the plurality of child nodes In other words, the Eq. (2) assigns a weight to a child node depending on the child node's probability score as well as the probability score of its' parent node. The influence of the parent node on the child node is increasingly reduced by means of a, as we go deeper in the hierarchy. The sum of the weighted probability of each child node in the union may be normalized to a value of 1.

At step 318, the method 300 sorts and identifies a top "N" number of child nodes based on the weighted probabilities of each child node. Similar to the sorting of the probabilities of the parent nodes as discussed in relation to step 308, the weighted scores of each child node of the union may be sorted in a descending order.

From the descending order, the top "N" number of child nodes may be selected. In one embodiment, the value of "N" may be predefined. In another embodiment, the value of "N" may also be a function of the desired threshold value, τ.

At step 320, the method 300 combines the top "N" number of child nodes and respective adjacent child nodes to form a second union of a plurality of child nodes. The adjacent child nodes may include each node that is next to one of the top "N" number of child nodes. For example, FIG. 2 illustrates each adjacent child node as shaded nodes that are adjacent to a child node $208_{3,3}$. Each adjacent child node for each one of the top "N" number of child nodes may be then combined to form a second union similar to step 312 using Eq. (1). In other words, if two child nodes are included as the top "N" number of child nodes, the 8 adjacent nodes of the first child node and the 8 adjacent nodes of the second child node would be combined using Eq. (1) to form the second union.

At step 322, the method 300 calculates a new weighted probability for each child node of the second union of the plurality of child nodes. For example, Eq. (2) may be used to calculate a new weighted probability for each one of the top "N" child nodes and each adjacent child node of each one of the top "N" child nodes. The weighted probability for each child node in the second union may be sorted in a descending order.

At step 324, the method 300 identifies a top "N" number of nodes from the new weighted probability scores of the second union as being a predicted location of the short text. In one embodiment, the top "N" number of nodes with the highest weighted probabilities may be provided as the predicted location of the short text. In one embodiment, each child node may be associated with a particular coordinate value or longitude and latitude value that can be correlated to the geographical location 204. This information may be used to help generate the graphical representation of the predicted location of each short text as illustrated in FIG. 2. In another embodiment, the child node with the highest weighted probability may be provided as the predicted location.

In one embodiment, steps 308 to 324 may be collectively referred to a hierarchical classification algorithm. For example, a hierarchical classification of levels of parent nodes and subsequent levels of child nodes may be used to predict a location of the short text. Notably, the application of the hierarchical classification algorithm on scoring probabilities on parent nodes and child nodes provides a more accurate prediction than previous methods that only use an SVM classification algorithm.

At step 326, the method 300 determines if there are additional short texts that need to be analyzed. If the answer to step 326 is yes, the method 300 may return to step 306 and receive the next short text. Then the hierarchical classification algorithm may be applied to the next short text to predict a location of the short text. In other words, steps 308 to 324 may be repeated for each short text until a prediction of a location for each short text is performed. If the answer to step 326 is no, the method 300 may proceed to optional step 328.

At optional step 328, the method 300 may generate a graphical representation of the location of each short text within the grid. One example of a graphical representation may be the grid 202 illustrated in FIG. 2 and described above.

At optional step 330, the method 300 may receive a selection of a parent node within the grid. For example, a user may select one of the parent nodes of the grid to view each one of the short texts that have the predicted location in the selected parent node.

At optional step 332, the method 300 may provide each short text that is located within the parent node that is selected. For example, a new window may be displayed that includes all of the short texts having a predicted location at the parent node that is selected. In one embodiment, all of the short texts within a predefined period of time may be included in the window. In one embodiment, the window may provide options to filter or sort the short texts that are displayed. At step 334, the method 300 ends.

It should be noted that although not explicitly specified, one or more steps, functions, or operations of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIGS. 3A and 3B that recite a determining operation, or involve a decision, do not necessarily require that both branches of the determining operation be practiced. In other words, one of the branches of the determining operation can be deemed as an optional step.

FIG. 4 depicts a high-level block diagram of a general-purpose computer suitable for use in performing the functions described herein. As depicted in FIG. 4, the system 400 comprises one or more hardware processor elements 402 (e.g., a central processing unit (CPU), a microprocessor, or a multi-core processor), a memory 404, e.g., random access memory (RAM) and/or read only memory (ROM), a module 405 for predicting a location of a short text, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 405 for predicting a location of a short text (e.g., a software program comprising computer-executable instructions) can be loaded into memory 404 and executed by hardware processor element 402 to implement the steps, functions or operations as discussed above in connection with the exemplary method 300. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for predicting a location of a short text (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for predicting a location of a short text, comprising:
    training, by a processor, a model for each parent node of a grid of a plurality of parent nodes of a geographical area using a plurality of previously received short texts having a known location;
    receiving, by the processor, the short text;
    applying, by the processor, a hierarchical modeling algorithm to the short text to calculate a weighted probability for one or more child nodes of one or more of the plurality of parent nodes;
    predicting, by the processor, the location of the short text within the grid of the geographical area based upon a child node of the one or more child nodes having a highest weighted probability;
    repeating, by the processor, the receiving, the applying and the predicting for a plurality of short texts;
    generating, by the processor, a graphical representation of the location of each one of the plurality of short texts within the grid, wherein the graphical representation comprises a plurality of parent nodes and each one of the plurality of parent nodes is associated with a different location;
    displaying, by the processor, the graphical representation in a first window;
    receiving, by the processor, a selection of a parent node of the plurality of parent nodes of the graphical representation; and
    displaying, by the processor, in a second window a list of one or more of the plurality of short texts that were predicted to be in the location of the parent node that is selected.

2. The method of claim 1, wherein the geographical area is a city.

3. The method of claim 1, wherein the location comprises a longitude and latitude value within the geographical area.

4. The method of claim 1, wherein the graphical representation comprises a color coding for each one of the plurality of parent nodes within the grid based upon a number of short texts located in a respective one of the plurality of parent nodes.

5. The method of claim 1, wherein the training the model is performed using a support vector machine (SVM) classification.

6. The method of claim 1, wherein the applying the hierarchical modeling algorithm to the short text to calculate a weighted probability for one or more child nodes comprises including each adjacent node of each one of the one or more child nodes.

7. The method of claim 1, wherein the one or more of the plurality of parent nodes comprise a top "d" number of parent nodes, each one of the top "d" number of parent nodes having a respective probability of being the location of the short text, wherein a sum of the respective probability of each one of the top "d" number of parent nodes is greater than a desired threshold value, wherein "d" is a dynamic number based on the desired threshold value.

8. The method of claim 1, wherein the predicting comprises providing a top "N" number child nodes having the highest weighted probability as predictions of the location in a decreasing order of the highest weighted probability, where "N" is a predefined number.

9. A non-transitory computer-readable medium storing a plurality of instructions which, when executed by a processor, cause the processor to perform operations for predicting a location of a short text, the operations comprising:
training a model for each parent node of a grid of a plurality of parent nodes of a geographical area using a plurality of previously received short texts having a known location;
receiving the short text;
applying a hierarchical modeling algorithm to the short text to calculate a weighted probability for one or more child nodes of one or more of the plurality of parent nodes;
predicting the location of the short text within the grid of the geographical area based upon a child node of the one or more child nodes having a highest weighted probability;
repeating the receiving, the applying and the predicting for a plurality of short texts;
generating a graphical representation of the location of each one of the plurality of short texts within the grid, wherein the graphical representation comprises a plurality of parent nodes and each one of the plurality of parent nodes is associated with a different location;
displaying the graphical representation in a first window;
receiving a selection of a node of the plurality of parent nodes of the graphical representation; and
displaying in a second window a list of one or more of the plurality of short texts that were predicted to be in the location of the parent node that is selected.

10. The non-transitory computer-readable medium of claim 9, wherein the location comprises a longitude and latitude value within the geographical area.

11. The non-transitory computer-readable medium of claim of claim 9, wherein the graphical representation comprises a color coding for each one of the plurality of parent nodes within the grid based upon a number of short texts located in a respective one of the plurality of parent nodes.

12. The non-transitory computer-readable medium of claim of claim 9, wherein the training the model is performed using a support vector machine (SVM) classification.

13. The non-transitory computer-readable medium of claim 9, wherein the applying the hierarchical modeling algorithm to the short text to calculate a weighted probability for one or more child nodes comprises including each adjacent node of each one of the one or more child nodes.

14. The non-transitory computer-readable medium of claim of claim 9, wherein the one or more of the plurality of parent nodes comprise a top "d" number of parent nodes, each one of the top "d" number of parent nodes having a respective probability of being the location of the short text, wherein a sum of the respective probability of each one of the top "d" number of parent nodes is greater than a desired threshold value, wherein "d" is a dynamic number based on the desired threshold value.

15. The non-transitory computer-readable medium of claim of claim 9, wherein the predicting comprises providing a top "N" number child nodes having the highest weighted probability as predictions of the location in a decreasing order of the highest weighted probability, where "N" is a predefined number.

16. A method for predicting a location of a short text, comprising:
training, by a processor, a model for each parent node of a grid of a plurality of parent nodes of a geographical area using a plurality of previously received short texts having a known location, wherein the training is performed using a support vector machine (SVM) classifier;
receiving, by the processor, the short text;
calculating, by the processor, a probability for each one of the plurality of parent nodes that the short text is located in a respective one of the plurality of parent nodes;
selecting, by the processor, a top "d" number of the plurality of parent nodes based on a respective probability, wherein a sum of the respective probability for each one of the top "d" number of the plurality of parent nodes is greater than a desired threshold, wherein "d" is a dynamic number based on the desired threshold and the desired threshold represents a percentage of accuracy desired for a prediction;
normalizing, by the processor, the sum of the top "d" number of the plurality of parent nodes to a value of 1;
combining, by the processor, a plurality of child nodes to form a union of the plurality of child nodes, wherein the plurality of child nodes comprise one or more child nodes from each one of the top "d" number of the plurality of parent nodes;
training, by the processor, a classification model for union of the plurality of child nodes that are combined using the plurality of previously received short texts having the known location using the SVM classifier;
calculating, by the processor, a weighted probability for each one of the plurality of child nodes according to an equation:

$$w(c_{i,j}) = p(c_{i,j}) + \frac{p(x_{i,j})}{\alpha},$$

wherein $w(c_{i,j})$ represents the weighted probability of the short text being located at a child node $c_{i,j}$, $p(c_{i,j})$ is a probability of the short text being located at the child node $c_{i,j}$, $p(x_{i,j})$ is a probability of a parent node $x_{i,j}$ and $\alpha$ is a constant denoting a level in a hierarchy of the plurality of parent nodes and the plurality of child nodes;

normalizing, by the processor, the weighted probability for each one of the plurality of child nodes to a value of 1;

sorting, by the processor, the weighted probability of each one of the plurality of child nodes;

identifying, by the processor, a top "N" number of the plurality of child nodes based on a respective weighted probability, wherein "N" is a predefined number;

combining, by the processor, each one of the top "N" number of the plurality of child nodes and each adjacent child node of the each one of the top "N" number of plurality of child nodes to form a second union of the top "N" number of the plurality of child nodes and the each adjacent child node of the each one of the top "N" number of plurality of child nodes;

calculating, by the processor, a new weighted probability for each one of the top "N" number of plurality of child nodes and the each adjacent child node of the each one of the top "N" number of plurality of child nodes using the equation;

identifying, by the processor, a top "N" number of nodes from the top "N" number of plurality of child nodes and the each adjacent child node of the each one of the top "N" number of plurality of child nodes based on a respective new weighted probability as being a predicted location of the short text;

repeating, by the processor, the receiving, the calculating the probability, the selecting, the normalizing the sum of the top "d" number of the plurality of parent nodes, the combining the plurality of child nodes, the training, the calculating the weighted probability, the normalizing the weighted probability for the each one of the plurality of child nodes, the sorting, the identifying the top "N" number of the plurality of child nodes, the combining the each one of the top "N" number of the plurality of child nodes, the calculating the new weighted probability and the identifying the top "N" number of nodes from the top "N" number of plurality of child nodes, for a plurality of short texts;

generating, by the processor, a graphical representation of the location of each one of the plurality of short texts within the grid, wherein the graphical representation comprises the plurality of parent nodes and each one of the plurality of parent nodes is associated with a different location; and displaying, by the processor, the graphical representation in a window.

* * * * *